United States Patent
Maher et al.

(10) Patent No.: US 11,203,909 B2
(45) Date of Patent: Dec. 21, 2021

(54) SURFACE PLATFORM FOR USE WITH SURFACE BOPS AND HIGH-PRESSURE RISERS

(71) Applicant: Trendsetter Vulcan Offshore, Inc., Houston, TX (US)

(72) Inventors: James V. Maher, Houston, TX (US); Daniel McCelvey, Houston, TX (US)

(73) Assignee: TRENDSETTER VULCAN OFFSHORE, INC., Houston, TX (US)

( * ) Notice: Subject to any disclaimer, the term of this patent is extended or adjusted under 35 U.S.C. 154(b) by 0 days.

(21) Appl. No.: 16/467,694

(22) PCT Filed: Dec. 11, 2017

(86) PCT No.: PCT/US2017/065599
§ 371 (c)(1),
(2) Date: Jun. 7, 2019

(87) PCT Pub. No.: WO2018/107161
PCT Pub. Date: Jun. 14, 2018

(65) Prior Publication Data
US 2020/0063505 A1 Feb. 27, 2020

Related U.S. Application Data

(60) Provisional application No. 62/432,403, filed on Dec. 9, 2016.

(51) Int. Cl.
*E21B 33/043* (2006.01)
*E21B 33/035* (2006.01)
(Continued)

(52) U.S. Cl.
CPC ............ *E21B 33/043* (2013.01); *E21B 17/01* (2013.01); *E21B 17/085* (2013.01);
(Continued)

(58) Field of Classification Search
None
See application file for complete search history.

(56) References Cited

U.S. PATENT DOCUMENTS 5,381,750 A * 1/1995 Pollack ............... B63B 21/507
114/230.12
6,260,625 B1 7/2001 Phan et al.
(Continued)

OTHER PUBLICATIONS

International Search Report and Written Opinion for parent PCT application PCT/US2017/065599, 18 pages.

*Primary Examiner* — Matthew Troutman
*Assistant Examiner* — Douglas S Wood
(74) *Attorney, Agent, or Firm* — Jonathan Pierce; Pierre Campanac; Porter Hedges LLP

(57) ABSTRACT

A mudline closure device is lowered between tensioners coupled to a deck of a vessel or rig onto a subsea wellhead. A tensioner platform is then attached to the tensioners. The tensioner platform includes a platform opening having an inner diameter through which an emergency disconnect system may pass. The tensioner platform also includes rotation bearings secured in the platform opening. A split support includes outer surfaces disposed along its circumference. The outer surfaces are seated on the rotation bearings. The split support includes a support opening having an inner diameter through which a marine riser may pass. The split support also includes a landing shoulder secured in the support opening to suspend a surface blowout preventer to the deck. As the vessel or rig changes direction, the split support rotates relative to the tensioner platform without imparting excessive torsion on the marine riser.

18 Claims, 9 Drawing Sheets

(51) Int. Cl.
  *E21B 17/01* (2006.01)
  *E21B 33/06* (2006.01)
  *E21B 17/08* (2006.01)
  *E21B 19/00* (2006.01)
  *E21B 33/064* (2006.01)
  *E21B 17/10* (2006.01)
  *E21B 17/046* (2006.01)
  *E21B 19/16* (2006.01)
  *E21B 33/038* (2006.01)
  *F16L 37/08* (2006.01)

(52) U.S. Cl.
  CPC ........ *E21B 17/1085* (2013.01); *E21B 19/006* (2013.01); *E21B 33/035* (2013.01); *E21B 33/062* (2013.01); *E21B 33/064* (2013.01); *E21B 17/046* (2013.01); *E21B 19/165* (2013.01); *E21B 33/038* (2013.01); *F16L 37/08* (2013.01)

(56) References Cited

U.S. PATENT DOCUMENTS

| | | |
|---|---|---|
| 8,181,704 B2 | 5/2012 | Fenton |
| 8,579,034 B2 | 11/2013 | Berner, Jr. et al. |
| 9,200,493 B1 | 12/2015 | Lugo |
| 2004/0256096 A1 | 12/2004 | Adams |
| 2008/0031692 A1 | 2/2008 | Wybro et al. |
| 2011/0280668 A1* | 11/2011 | Norwood ............. E21B 19/006 405/224.4 |
| 2012/0201611 A1* | 8/2012 | Flores, Sr. ............ E21B 19/006 405/224.4 |
| 2013/0299178 A1 | 11/2013 | Deberry et al. |

* cited by examiner

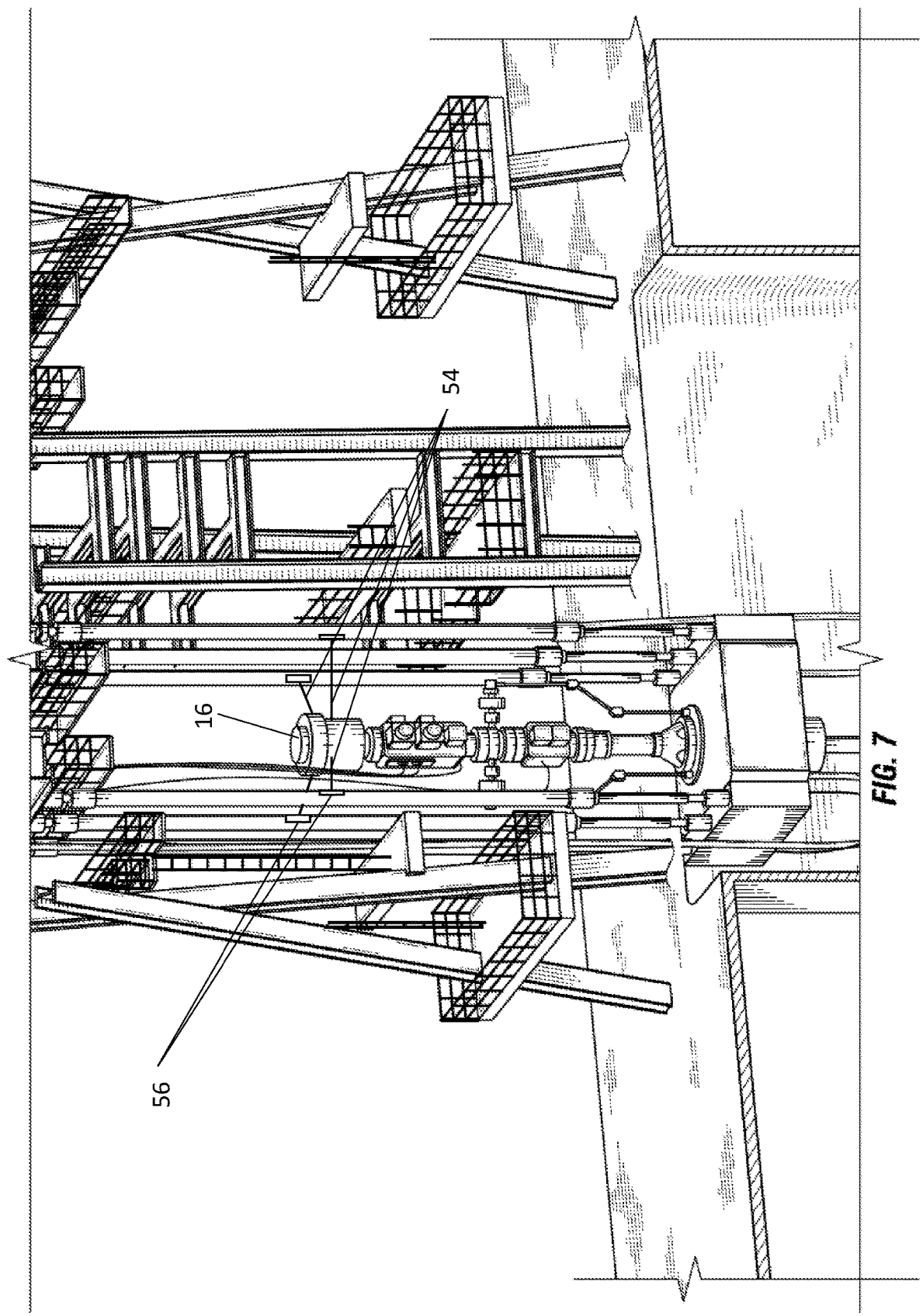

SURFACE PLATFORM FOR USE WITH SURFACE BOPS AND HIGH-PRESSURE RISERS

BACKGROUND

This disclosure relates generally to methods and apparatus for deploying a surface blowout preventer ("BOP") and a high-pressure marine riser from a vessel or rig onto a subsea wellhead.

A subsea well has a wellhead located on the seafloor. In some configurations, a mudline closure device ("MCD") is connected to the wellhead. The MCD is connected by a marine riser to a vessel or rig floating on the sea surface. A surface BOP is connected to the top of the marine riser. Given that most marine risers have bolted connections, the riser may not be subjected to large torsion and/or elongation. Accordingly, the top of the marine riser and/or the surface BOP is suspended to the vessel or rig via tensioners, a platform, and a Karrot Top ("KT") ring assembly. The tensioners are connected between the vessel or rig and permit vertical movement of the vessel or rig relative to the platform. The KT ring assembly is connected between the platform and the top of the marine riser or between the platform and the surface BOP and permits rotational movement of the platform relative to the top of the marine riser or the surface BOP, so that the vessel or rig can be free to take on a desired heading rather than be fixed to an initial direction.

The typical approach for allowing the surface BOP and/or the MCD to be run through the platform is to remove the KT ring assembly, therefore, KT ring assembly is usually split. It is also desirable to have the KT ring assembly include interfaces to the drape lines and hydraulic paths through the ring assembly. The KT ring assembly often includes fluid bearings that must be activated prior to accommodating any rotational movement. An example of KT ring assembly is illustrated in U.S. Patent Application Pub. No. 2007/0063507.

When a high-pressure marine riser is used, the riser may be assembled with threaded and coupled ("T&C") connectors, which may be even less tolerant to torsion than bolted connections. Further, surface loads and moments that are larger than with standard subsea equipment may develop. The resulting moments may, therefore, be too large to accommodate the KT ring assembly using standard mechanical connections. Still further, the tensioners must be nearly vertical to allow the surface BOP and the KT ring assembly to rotate.

Thus, there is a continuing need in the art for methods and apparatus for deploying a surface BOP and a high-pressure marine riser from a vessel or rig onto a subsea wellhead.

BRIEF SUMMARY OF THE DISCLOSURE

The disclosure describes a system for deploying a surface blowout preventer and a marine riser onto a subsea wellhead.

The system comprises a plurality of tensioners coupled to a deck of a vessel or rig.

The system comprises a tensioner platform including a platform opening having a first inner diameter. The tensioner platform is attachable to the plurality of tensioners. The tensioner platform comprises an upper rotation bearing secured in the platform opening. The tensioner platform also comprises a lower rotation bearing secured in the platform opening below the upper rotation bearing. The upper rotation bearing and/or the lower rotation bearing may be mechanical bearings, for example, roller bearings. The tensioner platform may be detachable from the plurality of tensioners.

The system comprises a split support having a circumference. The split support includes a first outer surface disposed along at least a portion of the circumference, and a second outer surface disposed along the circumference and offset from the first outer surface. The first outer surface and the second outer surface simultaneously seat respectively on the upper rotation bearing and the lower rotation bearing. The split support also includes a support opening having a second inner diameter. The second diameter is smaller than the first diameter. The split support also includes a landing shoulder secured in the support opening. The landing shoulder may be sized to support a circumference of a tension ring. The split support may include one or more pipes that pass from a lower surface of the split support to an upper surface of the split support. The one or more pipes may be fitted with quick-connect terminations couplable to hydraulic lines. The split support may be radially collapsible for facilitating insertion into and/or removal from the platform opening.

The system may further comprise a tension joint having a bore, and a tension ring secured around the tension joint. A lower end of the tension joint may be connectable to the marine riser. An upper end of the tension joint may be connectable to a lower end of the surface blowout preventer, for example, through an adapter.

The system may further comprise a centralizer surrounding the marine riser and sized to press against the support opening.

The system may further comprise a plurality of flexible members. Each of the plurality of flexible member may have a first end coupled to a winch and a second end coupled to the surface blowout preventer.

The disclosure describes a method of deploying a surface blowout preventer and a marine riser onto a subsea wellhead.

The method may comprise lowering a mudline closure device between the plurality of tensioners onto the subsea wellhead before attaching the tensioner platform to the plurality of tensioners.

The method may comprise lowering an emergency disconnect system through the platform opening before seating the first outer surface and the second outer surface of the split support, respectively on the upper rotation bearing and the lower rotation bearing.

The method may comprise connecting the lower end of the tension joint to the marine riser. The method may comprise connecting the upper end of the tension joint to the lower end of the surface blowout preventer. The method may comprise supporting the circumference of the tension ring with the landing shoulder. The method may further comprise coupling hydraulic lines to the one or more pipes.

The method may further comprise imparting a preload to the plurality of flexible members.

The method may further comprise pressing the centralizer into the support opening.

The method comprises using the upper rotation bearing and the lower rotation bearing to rotate the split support relative to the tensioner platform.

BRIEF DESCRIPTION OF THE DRAWINGS

For a more detailed description of the embodiments of the disclosure, reference will now be made to the accompanying drawings, wherein:

FIGS. 3-7 illustrate a sequence for deploying a surface blowout preventer and a marine riser onto a subsea wellhead using the system shown in FIGS. 1A and 1B.

DETAILED DESCRIPTION

Figure 1A:
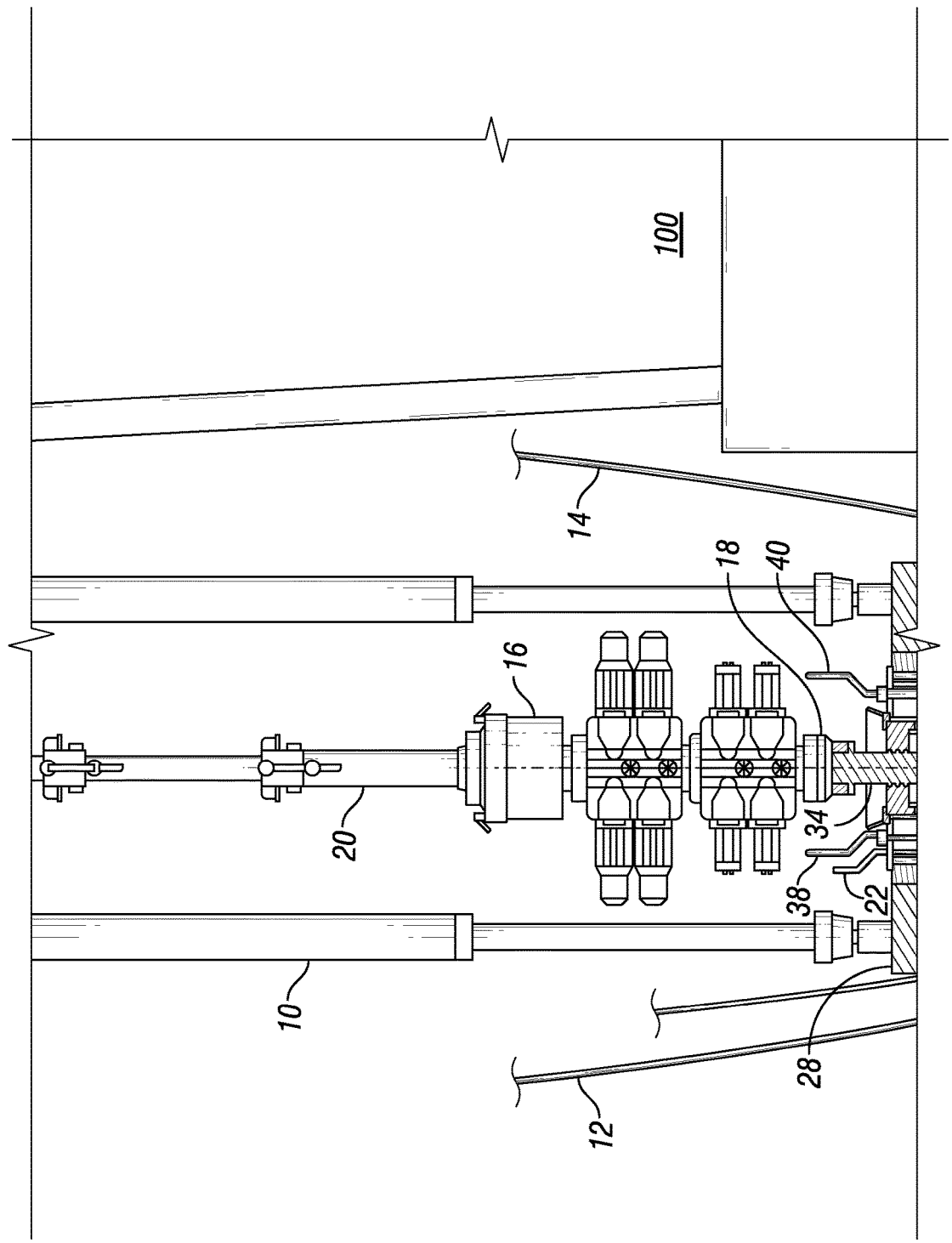
FIG. 1A is a schematic of an upper portion of a system for deploying a surface blowout preventer and a marine riser onto a subsea wellhead.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be exact or approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

In the following discussion and in the claims, the terms "including" and "comprising" are used in an open-ended fashion, and thus should be interpreted to mean "including, but not limited to." Furthermore, as it is used in the claims or specification, the term "or" is intended to encompass both exclusive and inclusive cases, i.e., "A or B" is intended to be synonymous with "at least one of A and B," unless otherwise expressly specified herein.

Certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function.

Figure 1B:
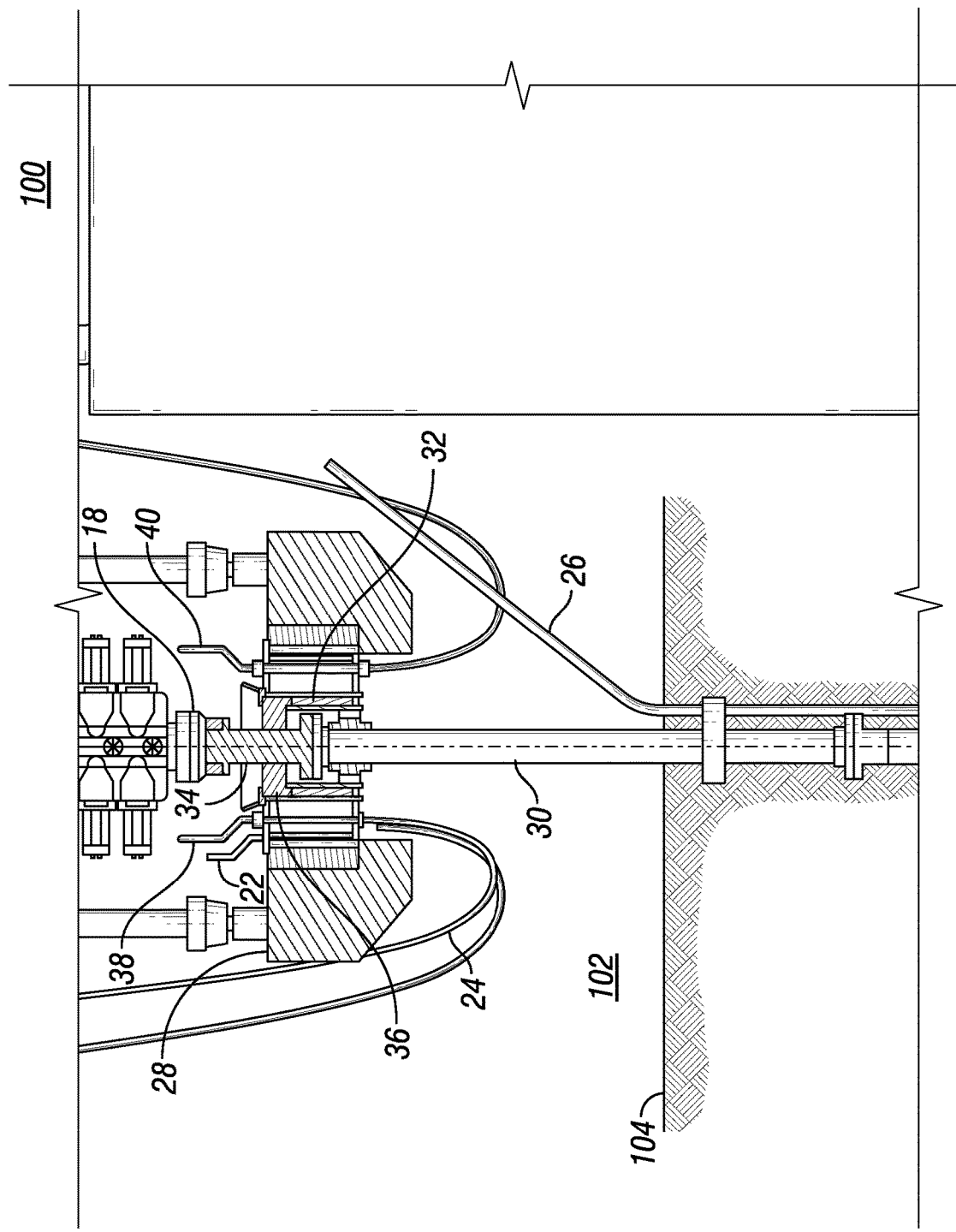
FIG. 1B is a schematic of a lower portion of the system shown in FIG. 1.

FIGS. 1A, 1B, 2A, and 2B illustrate a deck 100 of a vessel or rig floating on the sea surface 104 (in FIG. 1B). The vessel or rig is positioned above the wellhead (not shown) of a subsea well.

A riser 30 (in FIG. 1B) extends from the wellhead located on the seabed to the sea surface 104. The riser 30 may be a high-pressure riser formed from pipes coupled together via T&C connectors. An upper tapered stress joint, which forms the top of the riser 30, is coupled to a tension joint 34. The tension joint 34 is coupled to a surface BOP 16 via a BOP adapter 18 (in FIG. 1A). A telescopic joint 20 is coupled to the top of the surface BOP 16. As such, the riser 30, the tension joint 34, the surface BOP 16, and the telescopic joint 20 form a conduit spanning from the wellhead located on the seafloor to the vessel or rig. Telemetry controls 26 are clamped to the riser 30 and are used to control subsea components located on the seafloor (e.g., an MCD, an emergency disconnect system or EDS).

Tensioners 10 are coupled to the deck 100. A tensioner platform 28 is releasably attached to the tensioners 10. The tensioners 10 and the tensioner platform 28 are used to suspend the surface BOP 16 above the moonpool 102.

The tensioner platform 28 has an opening in which upper rotation bearing 42 and a lower rotation bearing 50 are secured. A split support 32 is provided in the opening of the tensioner platform 28 and rests on the upper rotation bearing 42 and the lower rotation bearing 50. As such, the split support 32 can rotate relative to the tensioner platform 28, and therefore, relative to the vessel or rig as the vessel or rig changes direction. The split support 32 is formed from segments that can be collapsed (e.g., disassembled) to facilitate the insertion of the split support 32 into the opening in the tensioner platform 28 and/or the removal of the split support 32 from the opening in the tensioner platform 28.

The split support 32 includes an opening having an inner diameter that is smaller than the inner diameter of the opening of tensioner platform 28. A landing shoulder 44 projects inwardly in the opening of the split support 32. A guide funnel 46 (in FIG. 2A) may be provided above the opening of the split support 32.

The opening of the split support 32 receives a tension ring 36. The tension ring 36 seats on the landing shoulder 44, and may be retained using a capture plate 48 (in FIG. 2A). The tension ring 36 meshes into the tension joint 34. As such, the tension ring 36 transmits the weight of the surface BOP 16 to the split support 32. A centralizer 52 (e.g., a packer, in FIG. 2B) that surrounds the riser 30 may also be inserted in the opening of the split support 32.

Hydraulic lines, including a kill drape line 12, a choke drape line 14, and an umbilical drape line 24, are connected to one or more pipes, including, respectively, a kill pipe 38, a choke pipe 40, and umbilical pipe 22 (stab plate disconnect). The one or more pipes pass from a lower surface of the split support 32 to an upper surface of the split support 32.

Given that the riser 30 may be assembled using T&C connections, it may be desirable to provide a passive rotation between the riser 30 and the tensioner platform 28. A passive rotation is more failsafe than hydraulic bearings. The passive rotation is implemented with the upper rotation bearing 42 and a lower rotation bearing 50, which provide a fully rotational surface bearing. The upper rotation bearing 42 and/or the lower rotation bearing 50 may be mechanical bearings. For example, the upper rotation bearing 42 and/or the lower rotation bearing 50 may be roller bearings.

Figure 2A:
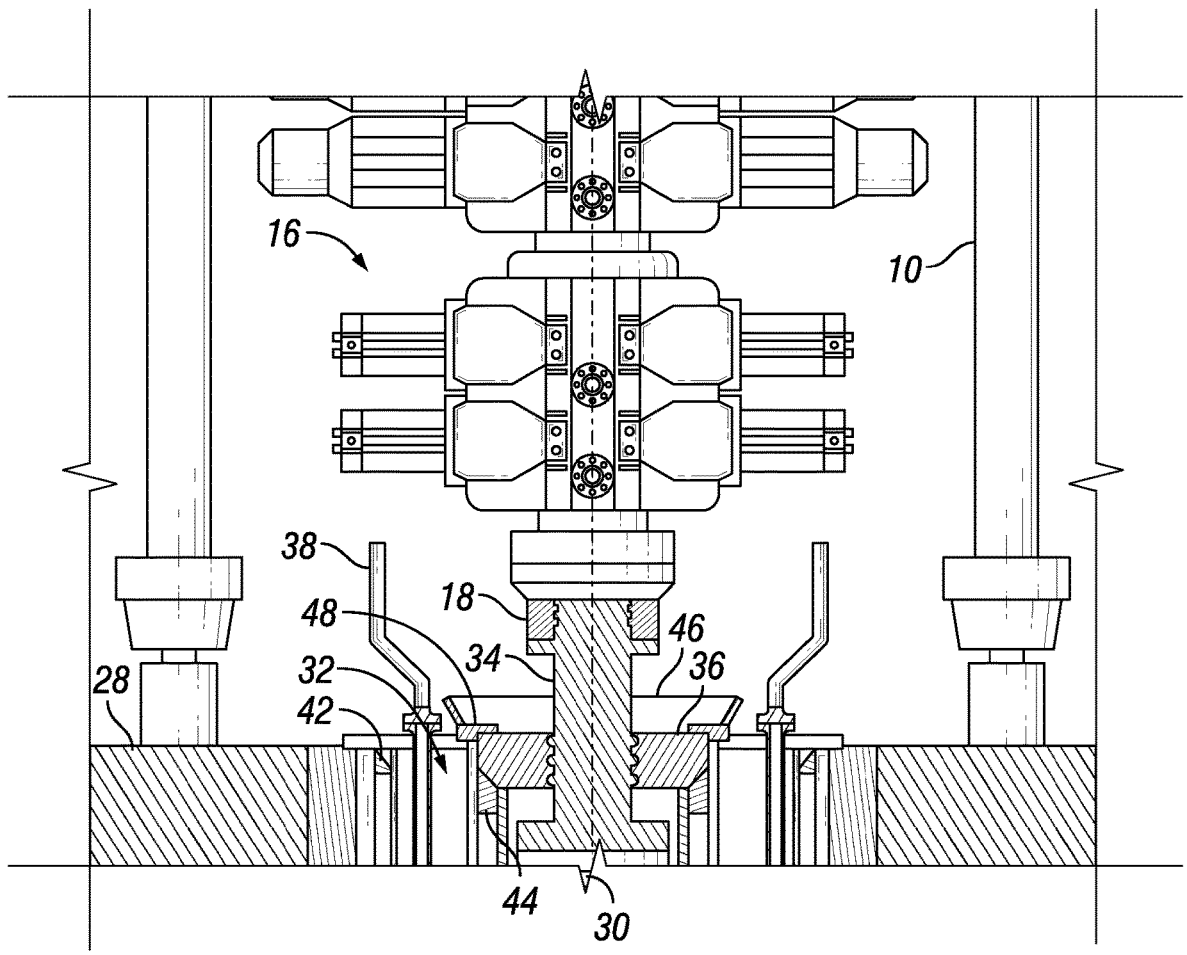
FIG. 2A is an enlarged schematic of a portion of the system shown in FIG. 1A.
Figure 2B:
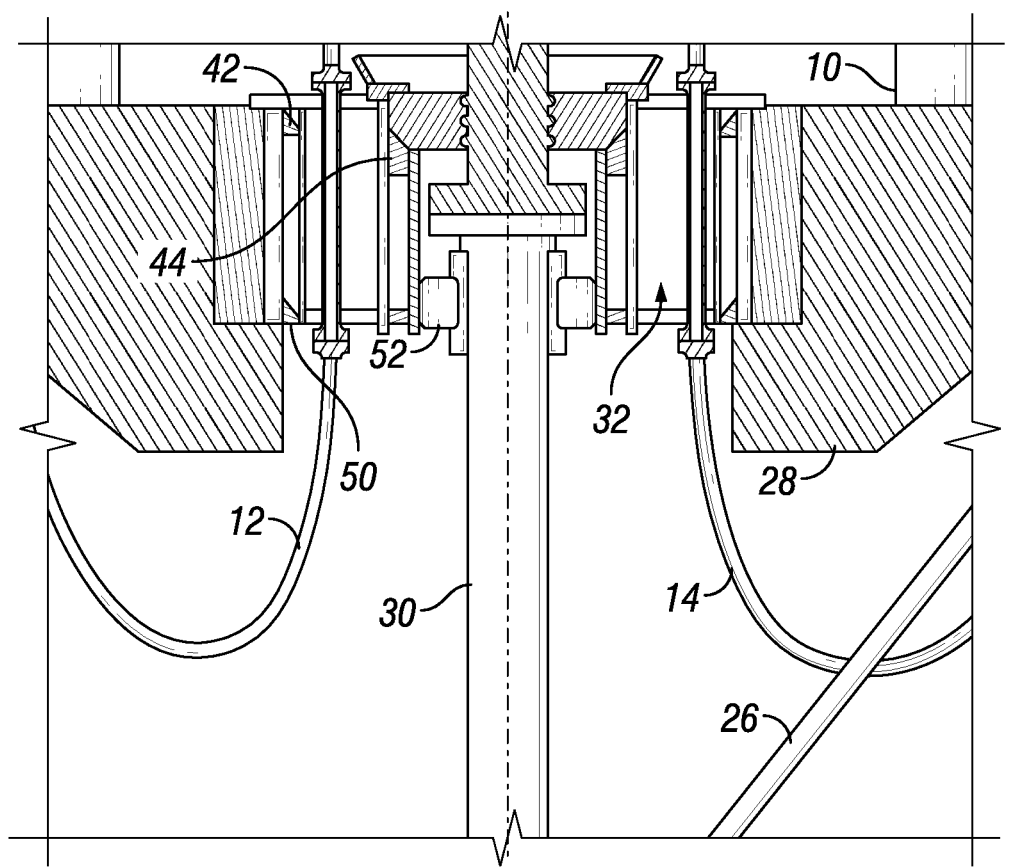
FIG. 2B is an enlarged schematic of a portion of the system shown in FIG. 1B.

As shown in FIGS. 1A and 1B, and further detailed in FIGS. 2A and 2B, the tensioner platform 28 may be coupled to the tensioners 10. Upper rotation bearing 42 and lower rotation bearing 50 (i.e., the outer bearing surface) are secured to the tensioner platform 28 and hold the at least a portion of the circumference of the split support 32.

The kill drape line 12, the choke drape line 14, and the umbilical drape line 24 can be attached to the one or more pipes that pass through the split support 32. Because the split support 32 sits inside the outer bearing surface, the one or more pipes have the ability to fully rotate with the split support 32 that holds the surface BOP 16. Thus, the one or more pipes can be connected to the surface BOP 16. The hydraulic lines can then be brought up to interface with the BOP using standard quick-connects, etc.

The surface BOP 16 itself may be subject to lateral loads that place potentially large moments on the bearing surface. These large moments can be eliminated by having vertical tethering systems that extend from the BOP frame down to connect into structural connections on the tensioner platform 28. These tethering systems may be similar to the TBOP application.

FIGS. 3-7 illustrate a sequence for constructing a high-pressure riser having a surface BOP using the surface platform described herein.

Figure 3:
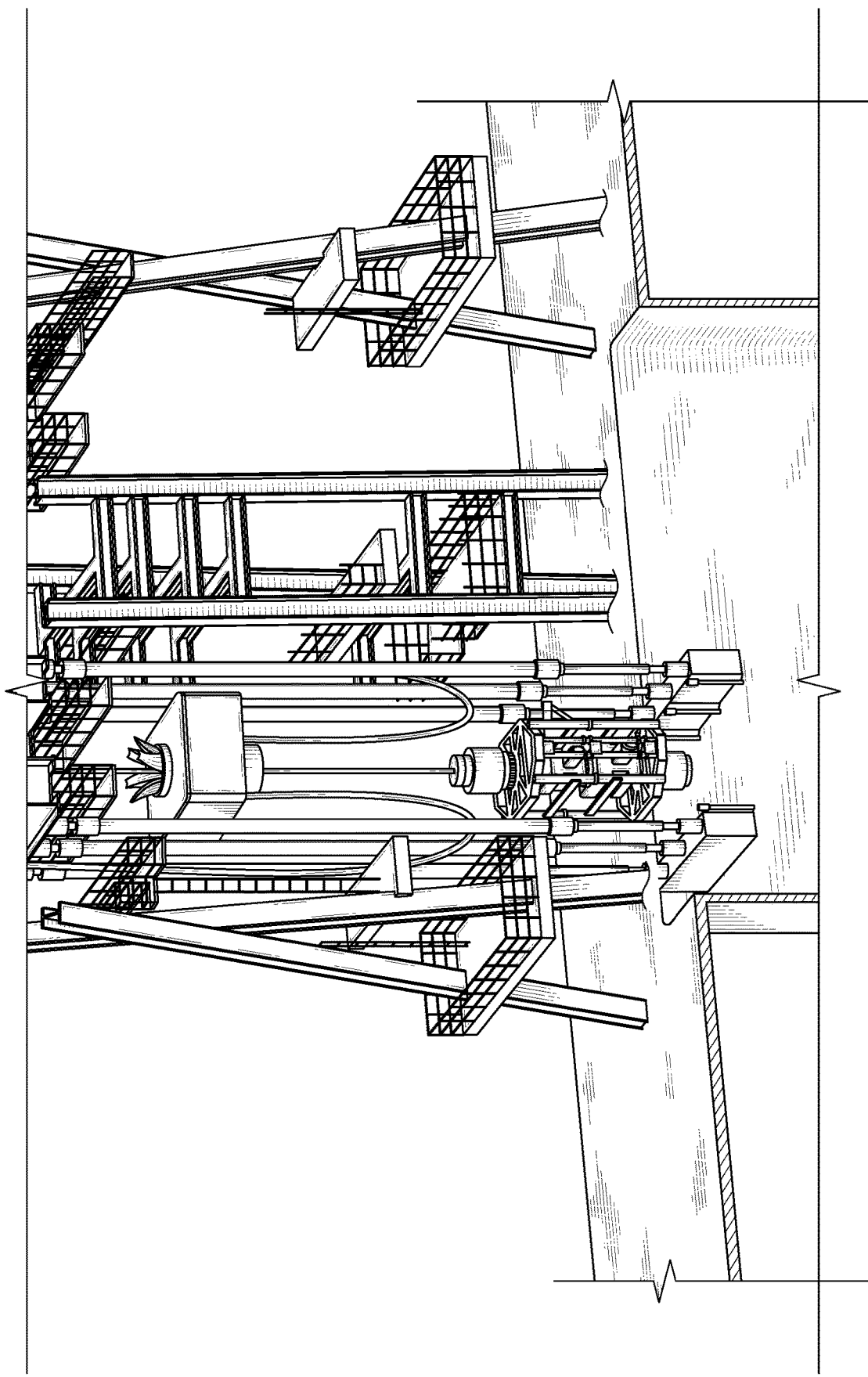

The tensioner platform 28 can be disconnectable from the tensioners 10 using the attachment features as shown in FIG. 3. This capability will allow the tensioner platform 28 to be easily removed and connected to the beams that typically support the diverter housing. In this way, the MCD can be brought into the moonpool 102 under the tensioner platform 28 without the need to remove or modify any of the tensioner connections. The drape lines will remain hooked up to the one or more pipes thereby minimizing the connection and reconnection during various steps for constructing the riser 30.

Figure 4:
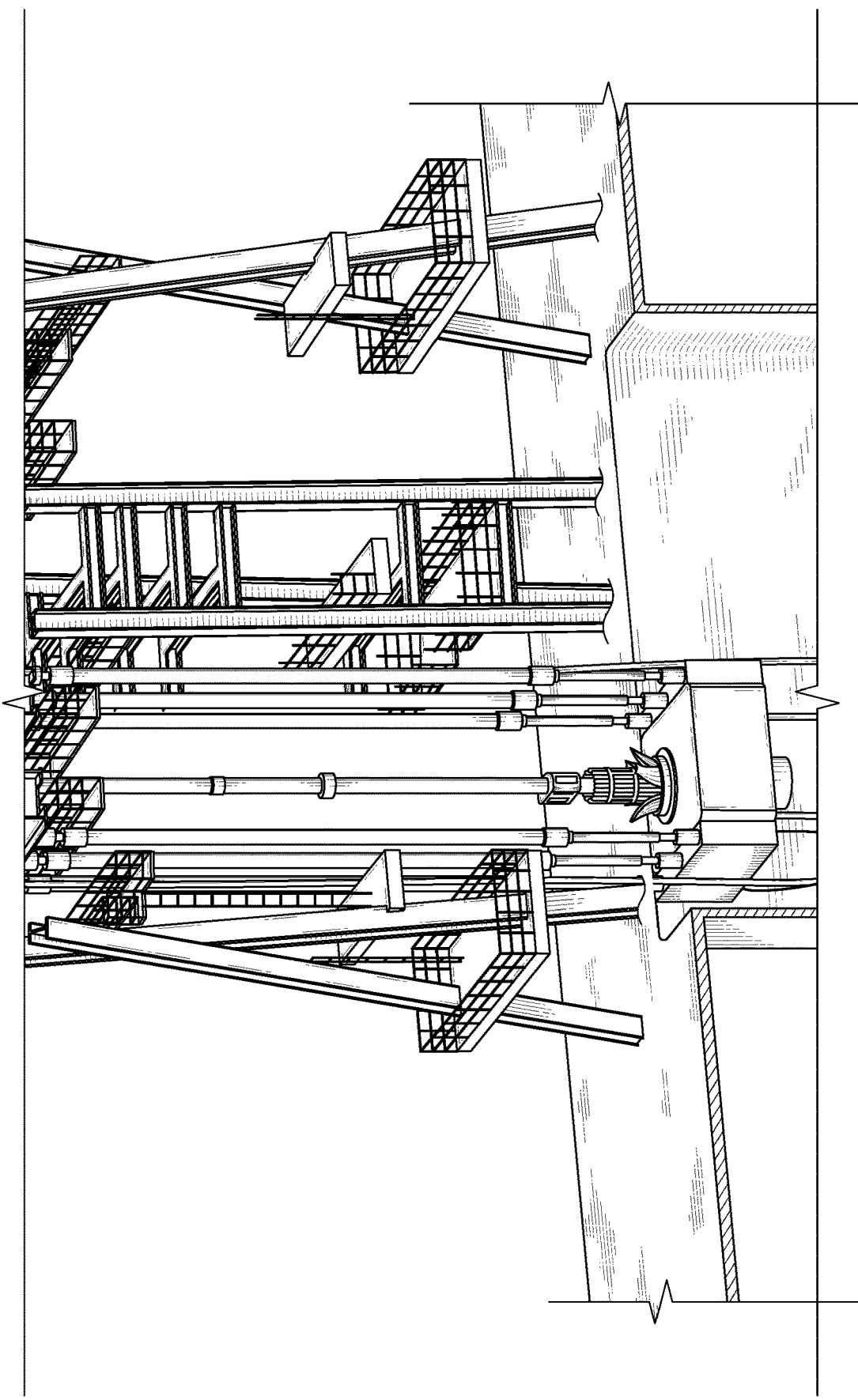

Given that the MCD does not need to pass down through the platform opening, the largest component that does need to pass is, therefore, the EDS, as shown in FIG. 4. The EDS consists of a subsea connector with associated systems.

Figure 5:
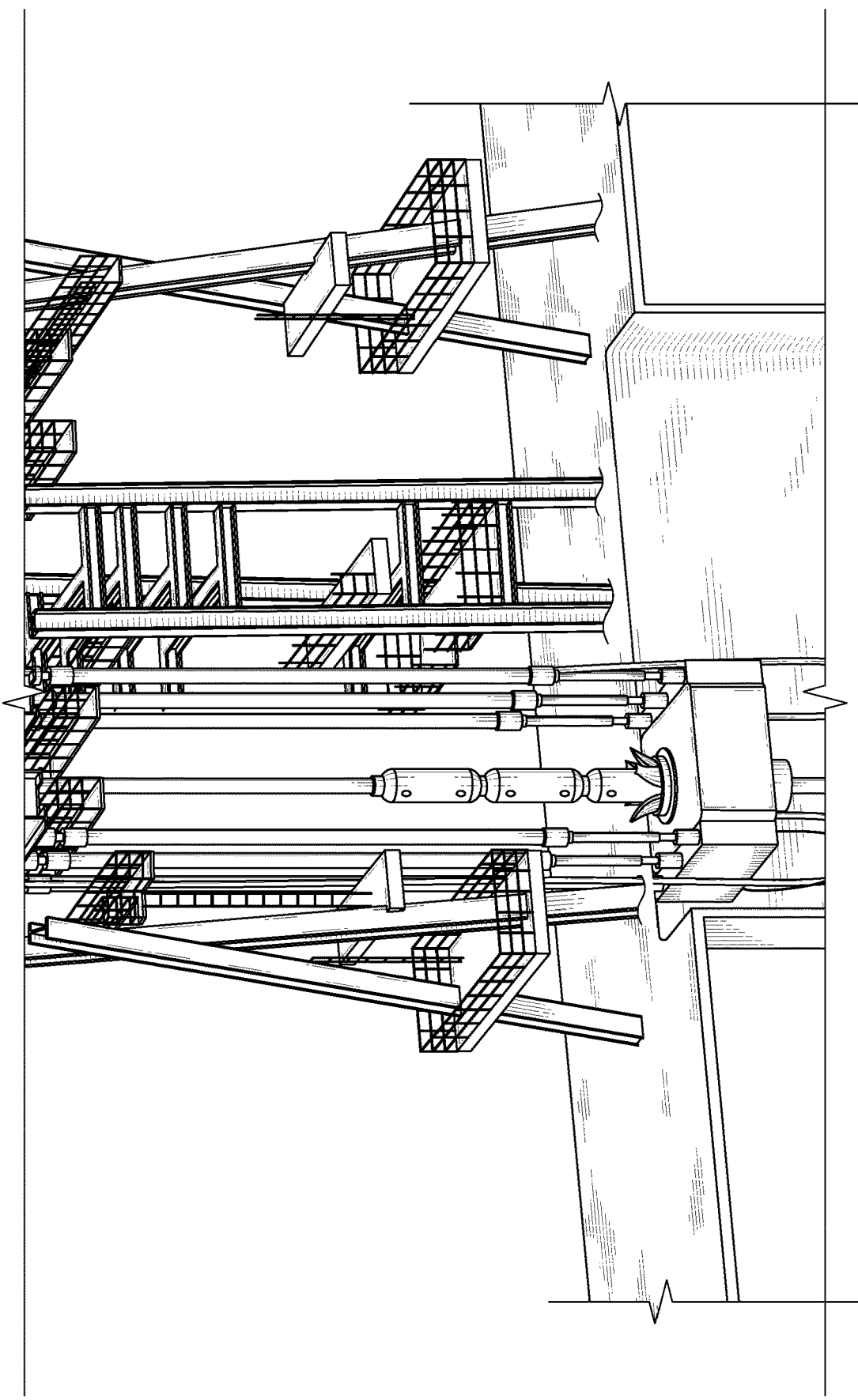

A very strong system can be provided by having the full riser pass through the platform opening, as shown in FIG. 5.

Figure 6:
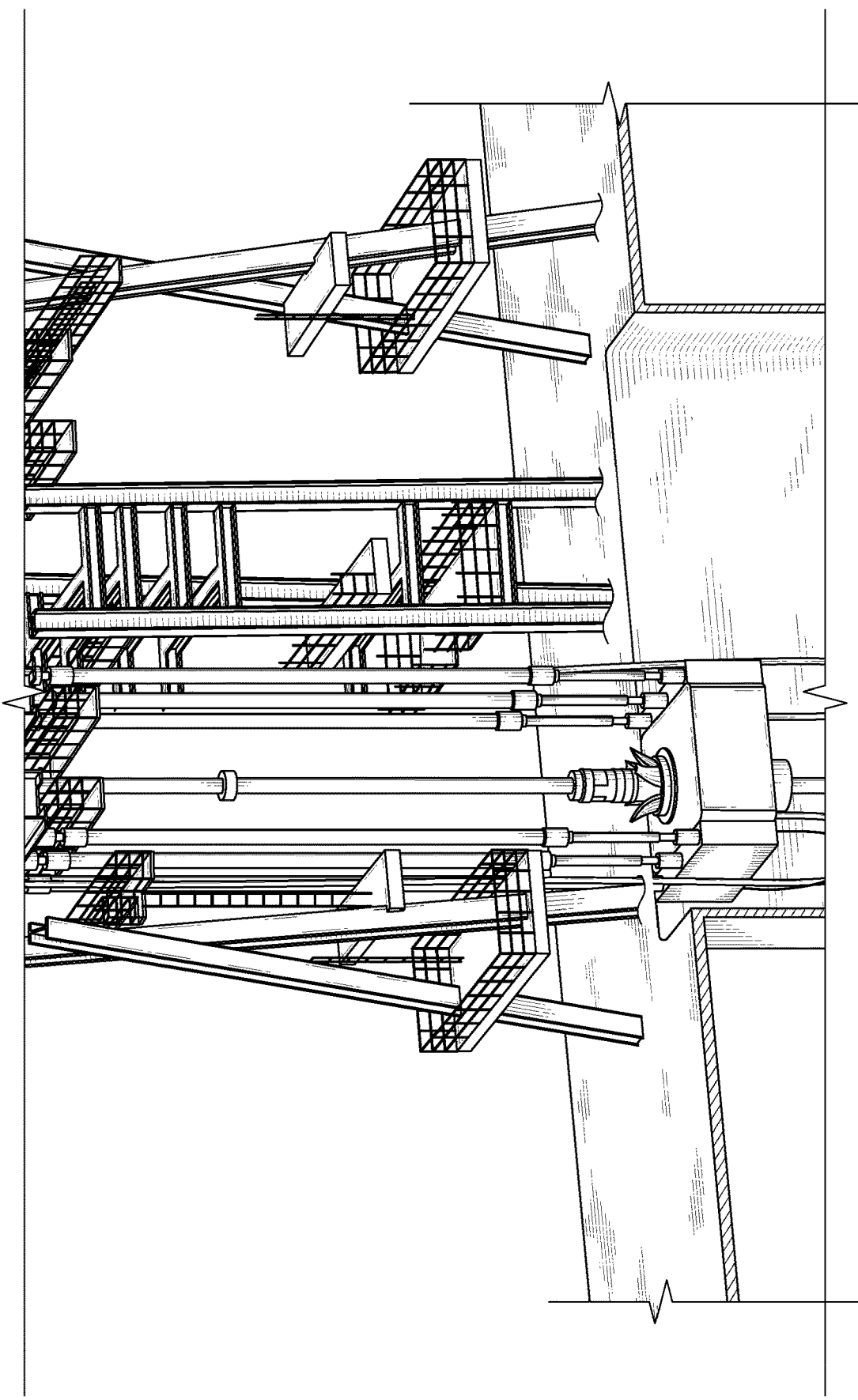

Then the split support 32 is seated over the bearing surface provided in the platform opening, as shown in FIG. 6.

The split support 32 is able to engage with the tension ring 36 connected below the surface BOP 16, as shown in FIG. 7.

The design of the split support 32 may remain simple as long as only minimal bending is allowed to pass through it. In order to minimize the bending moments, the centralizer 52 may be coupled to the tension joint 34 to be able to provide a lateral restraint. The centralizer 52 compresses up against the inner diameter of the split support 32.

As shown in FIG. 7, the system may further comprise a plurality of flexible members 54. Each of the plurality of flexible member 54 may have a first end coupled to a winch 56 and a second end coupled to the surface BOP 16.

While the disclosure is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A system for deploying a surface blowout preventer and a marine riser onto a subsea wellhead, comprising:
   a plurality of tensioners coupled to a deck of a vessel or rig;
   a tensioner platform including a platform opening having a first inner diameter, wherein the tensioner platform is attachable to the plurality of tensioners;
   an upper rotation bearing secured in the platform opening;
   a lower rotation bearing secured in the platform opening below the upper rotation bearing; and
   a split support having a circumference, a first outer surface at least partially disposed along the circumference, and a second outer surface at least partially disposed along the circumference and offset from the first outer surface, a support opening having a second inner diameter, and a landing shoulder secured in the support opening,
   wherein the upper rotation bearing and the lower rotation bearing are roller bearings,
   wherein the second diameter is smaller than the first diameter, and
   wherein the first outer surface and the second outer surface are configured to simultaneously seat respectively on the upper rotation bearing and the lower rotation bearing.

2. The system of claim 1, wherein the tensioner platform is detachable from the plurality of tensioners.

3. The system of claim 1, wherein the split support includes one or more pipes that pass from a lower surface of the split support to an upper surface of the split support.

4. The system of claim 3, wherein the one or more pipes are fitted with quick-connect terminations couplable to hydraulic lines.

5. The system of claim 1, further comprising:
   a tension joint having a bore; and
   a tension ring secured around the tension joint,
   wherein a lower end of the tension joint is connectable to the marine riser,
   wherein an upper end of the tension joint is connectable to a lower end of the surface blowout preventer, and
   wherein the landing shoulder is sized to support a circumference of the tension ring.

6. The system of claim 5, wherein the upper end of the tension joint is connectable to the lower end of the surface blowout preventer through an adapter.

7. The system of claim 1, further comprising a centralizer surrounding the marine riser and sized to press against the support opening.

8. The system of claim 1, further comprising a plurality of flexible members, wherein each of the plurality of flexible members has a first end coupled to a winch and a second end coupled to the surface blowout preventer.

9. The system of claim 1, 3, 4, 5, 6 or 7, wherein the split support is radially collapsible.

10. A method of deploying a surface blowout preventer and a marine riser onto a subsea wellhead, comprising:
    attaching a tensioner platform including a platform opening having a first inner diameter to a plurality of tensioners coupled to a deck of a vessel or rig, wherein the tensioner platform includes an upper rotation bearing secured in the platform opening, and a lower rotation bearing secured in the platform opening below the upper rotation bearing;
    providing a split support having a circumference, a first outer surface at least partially disposed along the circumference, and a second outer surface at least partially disposed along the circumference and offset from the first outer surface, a support opening having a second inner diameter, and a landing shoulder secured in the support opening;
    radially collapsing the split support;

inserting the split support into the platform opening;
radially expanding the split support in the platform opening; and
simultaneously seating the first outer surface and the second outer surface respectively on the upper rotation bearing and the lower rotation bearing.

11. The method of claim 10, further comprising lowering a mudline closure device between the plurality of tensioners onto the subsea wellhead before attaching the tensioner platform to the plurality of tensioners.

12. The method of claim 10, further comprising lowering an emergency disconnect system through the platform opening before seating the first outer surface and the second outer surface respectively on the upper rotation bearing and the lower rotation bearing.

13. The method of claim 10, further comprising:
providing a tension joint having a bore and a tension ring secured around the tension joint;
connecting a lower end of the tension joint to the marine riser, connecting an upper end of the tension joint to a lower end of the surface blowout preventer; and
supporting a circumference of the tension ring with the landing shoulder.

14. The method of claim 13, further comprising:
providing a plurality of flexible members, wherein each of the plurality of flexible members has a first end coupled to a winch and a second end coupled to the surface blowout preventer; and
imparting a preload to the plurality of flexible members.

15. The method of claim 10, further comprising:
providing a centralizer surrounding the marine riser; and
pressing the centralizer into the support opening.

16. The method of claim 10, further comprising coupling hydraulic lines to one or more pipes that pass from a lower surface of the split support to an upper surface of the split support.

17. The method of claim 10, further comprising using the upper rotation bearing and the lower rotation bearing to rotate the split support relative to the tensioner platform.

18. The method of claim 10, 15, or 17, wherein the upper rotation bearing and the lower rotation bearing are roller bearings, the method further comprising simultaneously seating the first outer surface and the second outer surface respectively on rollers of the upper rotation bearing and on rollers of the lower rotation bearing.

* * * * *